(12) United States Patent
Ueno et al.

(10) Patent No.: US 11,745,960 B2
(45) Date of Patent: Sep. 5, 2023

(54) LINEAR CONVEYOR SYSTEM, CONTROL METHOD FOR LINEAR CONVEYOR SYSTEM, CONTROL PROGRAM FOR LINEAR CONVEYOR SYSTEM AND STORAGE MEDIUM

(71) Applicant: YAMAHA HATSUDOKI KABUSHIKI KAISHA, Iwata (JP)

(72) Inventors: Kenji Ueno, Iwata (JP); Takayoshi Fujita, Iwata (JP); Hiroki Hoshina, Iwata (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 120 days.

(21) Appl. No.: 17/438,401

(22) PCT Filed: Mar. 29, 2019

(86) PCT No.: PCT/JP2019/014160
§ 371 (c)(1),
(2) Date: Sep. 10, 2021

(87) PCT Pub. No.: WO2020/202310
PCT Pub. Date: Oct. 8, 2020

(65) Prior Publication Data
US 2022/0144562 A1 May 12, 2022

(51) Int. Cl.
*B65G 54/02* (2006.01)
*B65G 43/00* (2006.01)
(Continued)

(52) U.S. Cl.
CPC ............ *B65G 54/02* (2013.01); *B65G 43/00* (2013.01); *H02K 9/22* (2013.01); *H02K 41/031* (2013.01); *B65G 2203/0283* (2013.01)

(58) Field of Classification Search
CPC ........ H02K 9/22; H02K 41/031; B65G 54/02; B65G 43/00; B65G 2203/0283
(Continued)

(56) References Cited

U.S. PATENT DOCUMENTS

| 4,532,869 A * | 8/1985 | Kondo | ................ B65G 35/063 |
| | | | 104/166 |
| 2014/0257554 A1* | 9/2014 | Takagi | ................ H02K 41/031 |
| | | | 700/229 |

(Continued)

FOREIGN PATENT DOCUMENTS

| JP | H05-193731 A | 8/1993 |
| JP | 5977145 B2 | 8/2016 |
| WO | 2018/055755 A1 | 3/2018 |

OTHER PUBLICATIONS

International Search Report issued in PCT/JP2019/014160; dated Jul. 2, 2019.

*Primary Examiner* — James R Bidwell
(74) *Attorney, Agent, or Firm* — Studebaker & Brackett PC

(57) ABSTRACT

Whether to permit or prohibit drive of at least one object, out of a slider and a movable linear module, is determined based on position related information on position of the slider or the movable linear module before the drive of the object is started. In this way, in a linear conveyor system for transferring the slider between a plurality of fixed linear modules using the movable linear modules, the occurrence of interference between the linear modules and the slider can be suppressed.

20 Claims, 9 Drawing Sheets

(51) Int. Cl.
 *H02K 9/22* (2006.01)
 *H02K 41/03* (2006.01)
(58) Field of Classification Search
 USPC .......................................................... 198/805
 See application file for complete search history.

(56) References Cited

U.S. PATENT DOCUMENTS

2019/0131860 A1* 5/2019 Suzuki ..................... B23Q 7/14
2021/0067007 A1* 3/2021 Okazaki ............... H02K 41/031

* cited by examiner

LINEAR CONVEYOR SYSTEM, CONTROL METHOD FOR LINEAR CONVEYOR SYSTEM, CONTROL PROGRAM FOR LINEAR CONVEYOR SYSTEM AND STORAGE MEDIUM

CROSS-REFERENCE TO RELATED APPLICATION

This application is a National Stage of International Patent Application No. PCT/JP2019/014160, filed Mar. 29, 2019, the entire contents of which is incorporated herein by reference.

BACKGROUND

Technical Field

This disclosure relates to a linear conveyor system with a mechanism for driving a slider by linear modules.

Background Art

JP5977145B describes a conveyance system which includes conveyance devices for conveying a slider in an X direction and transfer devices for conveying the slider received from the conveyance device in a Y direction and conveys a pallet supported on the slider by diving the slider. Such a conveyance system can cyclically drive the slider supporting the pallet by arranging two conveyance devices spaced apart in the Y direction and arranging two transfer devices on both sides in the X direction of these conveyance devices.

SUMMARY

The transfer devices for transferring the slider between a plurality of fixed linear modules (conveyance devices) for respectively driving the slider in the X direction can be configured by movable linear modules movable in the Y direction. In such a configuration, the movable linear modules move between a plurality of facing ranges respectively facing the plurality of fixed linear modules from the X direction. The slider can be moved between the fixed linear module facing one facing range, out of the plurality of facing ranges, and the movable linear module located in the one facing range. By using such movable linear modules, the slider can be transferred between the plurality of fixed linear modules.

However, in such a linear conveyor system, the linear module such as the fixed linear module or the movable linear module and the slider may interfere with each other due to an improper positional relationship thereof.

This disclosure was developed in view of the above problem and aims to provide a technique capable of suppressing the occurrence of interference of a linear module and a slider in a linear conveyor system for transferring the slider between a plurality of fixed linear modules by using a movable linear module.

A linear conveyor system according to the disclosure comprises a plurality of fixed linear modules respectively extending in a first direction, driving a slider in the first direction and arrayed in a second direction intersecting the first direction; a slider transfer mechanism including a movable linear module movable between a plurality of facing ranges, which are arranged in the second direction and respectively face the plurality of fixed linear modules from the first direction, and driving the slider in the first direction, the slider transfer mechanism conveying the movable linear module between the plurality of facing ranges by driving the movable linear module in the second direction; and a controller configured to control drive of at least one object, out of the slider and the movable linear module. The slider is engageable with and disengageable from the fixed linear module from an end in the first direction and the fixed linear module drives the slider engaged with the fixed linear module in the first direction. The slider is engageable with and disengageable from the movable linear module from an end in the first direction and the movable linear module drives the slider engaged with the movable linear module in the first direction. The slider moves between the movable linear module located in one facing range, out of the plurality of facing ranges, and the fixed linear module facing the one facing range, and the controller determines whether to permit or prohibit the drive of the object based on position related information on position of the slider or the movable linear module before the drive of the object is started.

A control method for a linear conveyor system according to the disclosure. The linear conveyor system includes a plurality of fixed linear modules respectively extending in a first direction, capable of driving a slider in the first direction and arrayed in a second direction intersecting the first direction, and a slider transfer mechanism having a movable linear module movable between a plurality of facing ranges, which are arranged in the second direction and respectively face the plurality of fixed linear modules from the first direction, and capable of driving the slider in the first direction, the slider transfer mechanism conveying the movable linear module between the plurality of facing ranges by driving the movable linear module in the second direction. The slider is engageable with and disengageable from the fixed linear module from an end in the first direction. The fixed linear module drives the slider engaged with the fixed linear module in the first direction. The slider is engageable with and disengageable from the movable linear module from an end in the first direction. The movable linear module drives the slider engaged with the movable linear module in the first direction. The slider is movable between the movable linear module located in one facing range, out of the plurality of facing ranges, and the fixed linear module facing the one facing range. The control method comprises obtaining position related information on position of the slider or the movable linear module; and determining whether to permit or prohibit drive of at least one object, out of the slider and the movable linear module, based on the position related information before the drive of the object is started.

A control program for a linear conveyor system according to the disclosure. The linear conveyor system includes a plurality of fixed linear modules respectively extending in a first direction, capable of driving a slider in the first direction and arrayed in a second direction intersecting the first direction, and a slider transfer mechanism having a movable linear module movable between a plurality of facing ranges, which are arranged in the second direction and respectively face the plurality of fixed linear modules from the first direction, and capable of driving the slider in the first direction. The slider transfer mechanism conveys the movable linear module between the plurality of facing ranges by driving the movable linear module in the second direction. The slider is engageable with and disengageable from the fixed linear module from an end in the first direction. The fixed linear module drives the slider engaged with the fixed linear module in the first direction. The slider is engageable with and disengageable from the movable linear module from an end in the first direction. The movable linear module drives the slider engaged with the movable linear module in the first direction. The slider is movable between the movable linear module located in one facing range, out of the plurality of facing ranges, and the fixed linear module facing the one facing range. The control program causes a computer to obtain position related information on position of the slider or the movable linear module; and determine whether to permit or prohibit drive of at least one object, out of the slider and the movable linear module, based on the position related information before the drive of the object is started.

A storage medium according to the disclosure computer-readably stores the control program for the above linear conveyor system.

In the thus configured disclosure (linear conveyor system, control method for linear conveyor system, control program for linear conveyor system and storage medium), the plurality of fixed linear modules are arrayed in the second direction, and each fixed linear module extends in the first direction intersecting the second direction and drives the slider in the first direction. Further, the slider transfer mechanism is provided to transfer the slider between these plurality of fixed linear modules. This slider transfer mechanism includes the movable linear module movable in the second direction. This movable linear module moves between the plurality of facing ranges and drives the slider in the first direction, the plurality of facing ranges being arranged in the second direction and respectively facing the plurality of fixed linear modules from the first direction. The slider is moved between the movable linear module located in the one facing range, out of the plurality of facing ranges, and the fixed linear module facing the one facing range. The slider can be transferred between the plurality of fixed linear modules by using such a slider transfer mechanism.

In the disclosure, whether to permit or prohibit the drive of at least one object, out of the slider and the movable linear module, is determined based on the position related information on the position of the slider or the movable linear module before the drive of the object is started. In this way, in the linear conveyor system for transferring the slider between the plurality of fixed linear modules by using the movable linear module, the occurrence of interference between the linear module and the slider can be suppressed.

The linear conveyor system may be configured so that the position related information includes the position of the movable linear module before the drive of the slider is started, and the controller permits the drive of the slider from one fixed linear module, out of the plurality of fixed linear modules, to the facing range if the movable linear module is located in the facing range facing the one fixed linear module when the slider needs to be moved from the one fixed linear module to the movable linear module to drive the slider to a target position. Also, the controller prohibits the drive of the slider if the movable linear module is at least partially located outside the facing range facing the one fixed linear module. In this way, the occurrence of interference between the slider and the movable linear module can be suppressed when the slider is moved from the fixed linear module to the movable linear module.

The linear conveyor system may be configured so that the controller prohibits the drive of the movable linear module in the second direction from the facing range facing the one fixed linear module until a movement of the slider from the one fixed linear module to the movable linear module is completed in the case of permitting the drive of the slider. In this way, a movement of the slider from the fixed linear module to the movable linear module can be completed while interference between the slider and the movable linear module is suppressed.

The linear conveyor system may be configured so that the position related information includes the position of the slider before the drive of the slider is started, and the controller permits the drive of the movable linear module if the slider before the start of the drive does not overlap a drive prohibition region including an end part of the fixed linear module and an end part of the facing range facing each other, and prohibits the drive of the movable linear module if the slider before the start of the drive overlaps the drive prohibition region. In such a configuration, it is possible to suppress the occurrence of interference between the slider and the linear module due to the drive of the movable linear module in the second direction with the slider engaged with both the end part of the fixed linear module and the end part of the movable linear module.

The linear conveyor system may be configured so that the position related information includes a target position as a drive destination of the slider. The controller permits the drive of the slider to the target position if the slider driven to the target position is predicted not to overlap a stop prohibition region including an end part of the fixed linear module and an end part of the facing range facing each other, and prohibits the drive of the slider if the slider driven to the target position is predicted to overlap the stop prohibition region. That is, if the slider overlaps the stop prohibition region as a result of driving the slider to the target position, the slider may stop while being engaged with both the end part of the fixed linear module and the end part of the movable linear module. At this time, if the movable linear module is driven in the second direction, interference occurs between the slider and the movable linear module. Accordingly, if the slider driven to the target position will overlap the stop prohibition region, the occurrence of interference between these can be suppressed by prohibiting the drive of the slider in the first place.

The linear conveyor system may further comprise a notifier configured to notify prohibition of the drive of the object by the controller to a user. In such a configuration, the user can appropriately perform an operation for the removal of the drive prohibition after grasping the drive prohibition of the object.

The linear conveyor system may be configured so that the notifier further notifies a cause for prohibiting the drive of the object. In such a configuration, the user can effectively perform the operation for the removal of the drive prohibition after grasping the cause for prohibiting the drive of the object.

According to the disclosure, the occurrence of interference between a slider and a linear module can be suppressed in a linear conveyor system for driving the slider using a plurality of linear modules.

DETAILED DESCRIPTION

Figure 1:
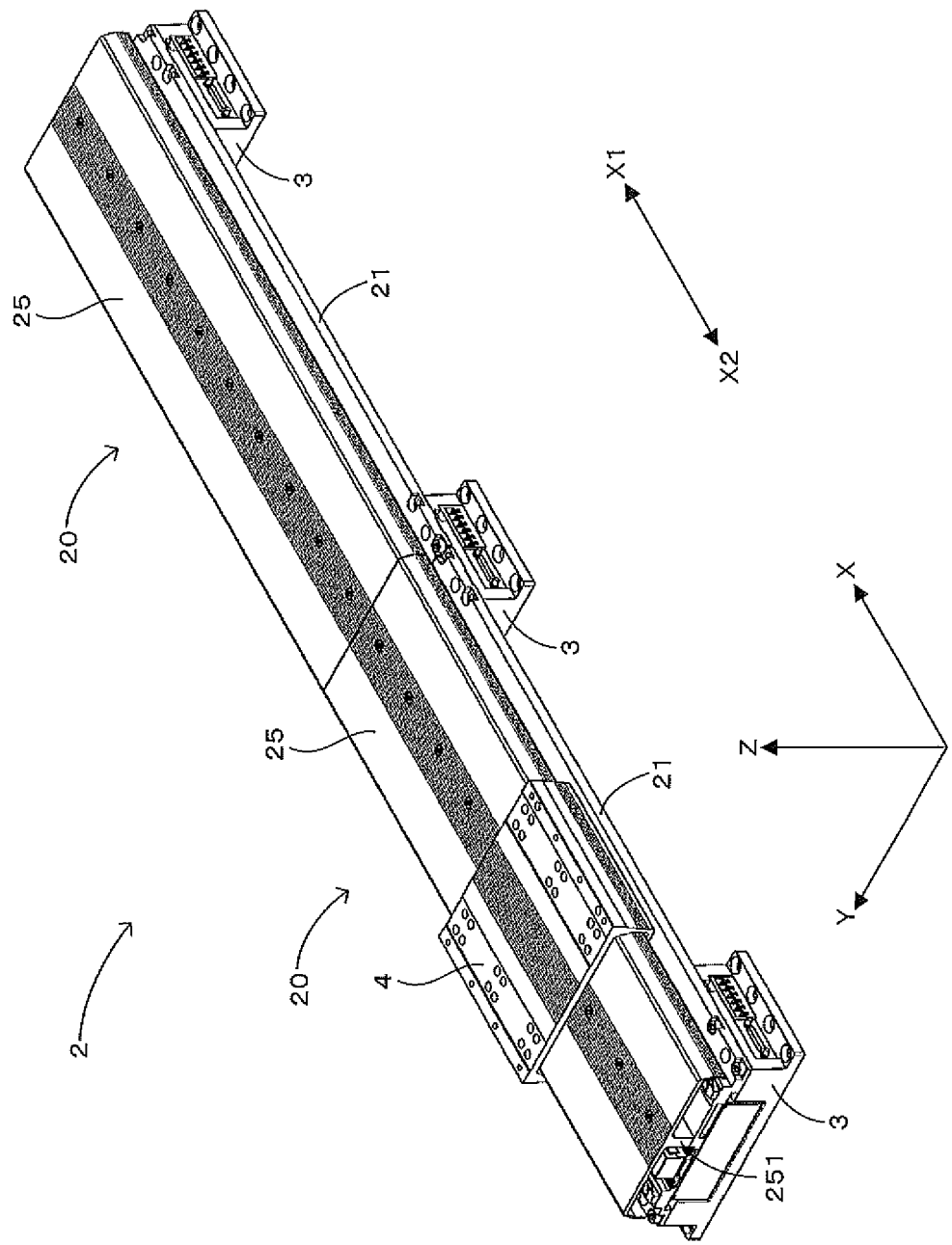
FIG. 1 is a perspective view showing an example of a linear module provided in a linear conveyor system according to the disclosure.
Figure 2:
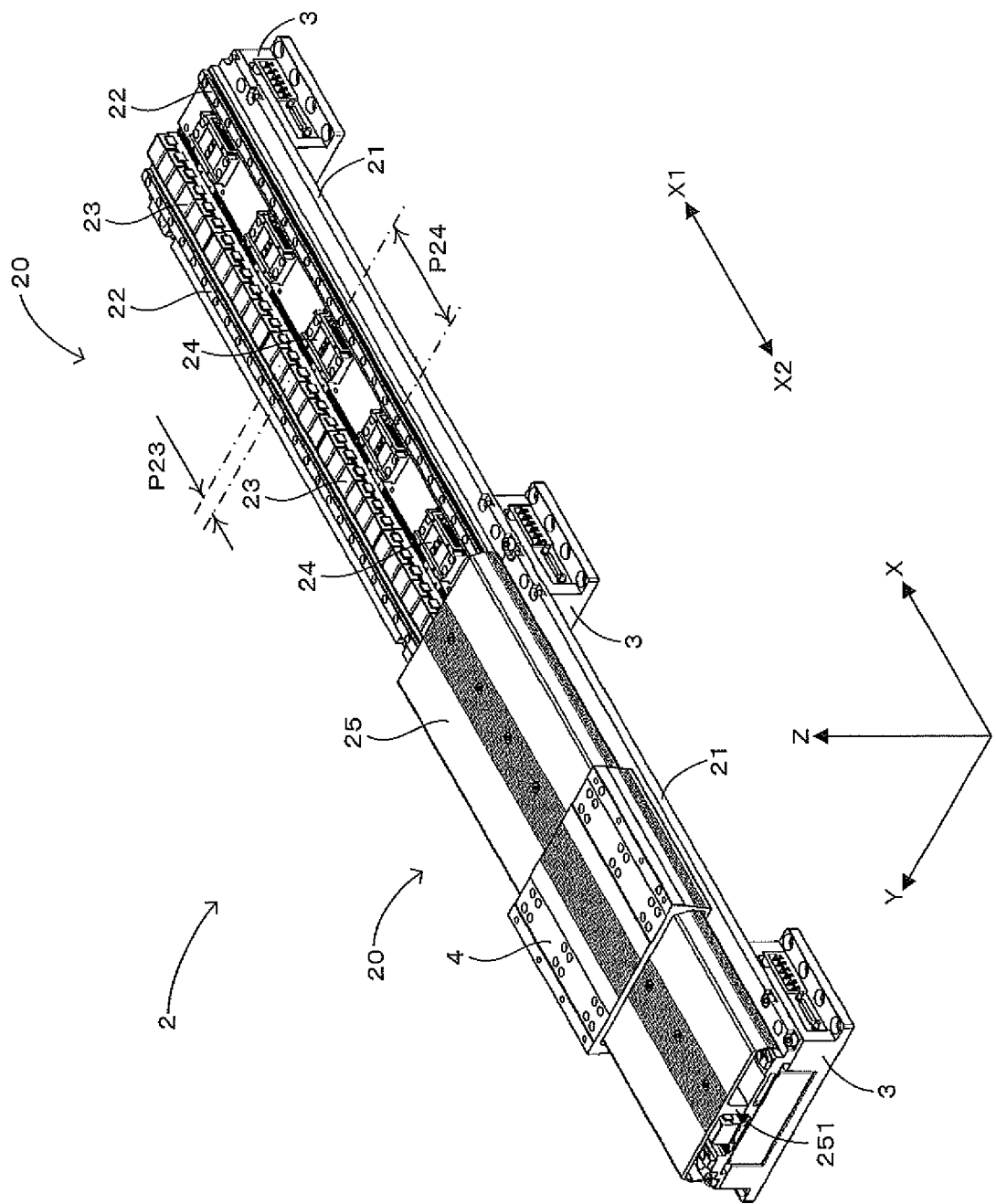
FIG. 2 is a perspective view showing the linear module of FIG. 1 with the inside of the linear module partially exposed.

FIG. 1 is a perspective view showing an example of a linear module provided in a linear conveyor system according to the disclosure, and FIG. 2 is a perspective view showing the linear module of FIG. 1 with the inside of the linear module partially exposed. In FIGS. 1 and 2, XYZ orthogonal coordinate axes indicating an X direction parallel to a horizontal direction, a Y direction parallel to the horizontal direction while being orthogonal to the X direction and a Z direction parallel to a vertical direction are shown. Further, an oblique right-upper side along the X direction is written as an X1 side and an oblique left-lower side along the X direction is written as an X2 side in both of figures. Similar notations are also used as appropriate in the following drawings. This linear module has a basic configuration similar to, for example, that of a module of a linear conveyor device described in WO2018/055709A1. Here, the entire linear conveyor system is described after the linear module is described.

The linear module 2 extending in the X direction, base members 3 supporting the linear module 2 from below and a slider 4 engaged with the linear module 2 are shown in FIGS. 1 and 2. The linear module 2 is mounted on the upper ends of three base members 3 arranged at equal intervals in the X direction and drives the slider 4 in the X direction by a magnetic force. In this example, the linear module 2 includes two module units 20 arrayed in the X direction. However, the number of the module units 20 included in the linear module 2 is not limited to two, and may be one, three or more.

The module unit 20 includes a base plate 21 extending in the X direction. The base plate 21 is a flat plate having a rectangular shape in a plan view from the Z direction. Two guide rails 22 parallel to the X direction are arranged on the upper surface of the base plate 21 while being spaced apart in the Y direction. Further, a plurality of linear motor stators 23 arranged in a row in the X direction at a predetermined arrangement pitch P23 and a plurality of magnetic sensors 24 arranged in a row in the X direction at a predetermined arrangement pitch P24 are mounted on the upper surface of the base plate 21. Here, the arrangement pitch P24 of the magnetic sensors 24 is longer than the arrangement pitch P23 of the linear motor stators 23. In the Y direction, the plurality of linear motor stators 23 are arranged between the two guide rails 22 and the plurality of magnetic sensors 24 are arranged between the linear motor stators 23 and one guide rail 22.

The linear motor stator 23 is an electromagnet including a coil and a core inserted in the coil. On the other hand, the slider 4 is provided with a mover including a permanent magnet and a back yoke holding the permanent magnet. The linear motor stators 23 drive the slider 4 in the X direction by giving magnetic thrust to the mover of the slider 4 by generating a magnetic flux corresponding to an applied current. Further, a magnetic scale indicating positions in the X direction is mounted on the slider 4, and the magnetic sensor 24 detects the position of the slider 4 in the X direction by reading the magnetic scale. The slider 4 is driven in the X direction by feedback-controlling the current applied to the linear motor stators 23 based on the position of the slider 4 detected by the magnetic sensors 24 as described later.

Further, the module unit 20 includes a cover member 25 which has a rectangular shape in a plan view and covers these guide rails 22, linear motor stators 23 and magnetic sensors 24 from above. The cover member 25 includes a support leg 251 projecting downward in a center in the Y direction, and the support leg 251 is mounted on the upper surface of the base plate 21. Clearances are formed between the cover member 25 and the base plate 21 on both sides in the Y direction, and both end parts of the slider 4 inserted between the cover member 25 and the base plate 21 through these clearances are respectively engaged with the two guide rails 22.

By arraying a plurality of (two) module units 20 in the X direction, the linear module 2 is configured. Such a linear module 2 has a rectangular shape in a plan view. The module unit 20 on the X1 side, out of the two module units 20 of the linear module 2, is laid between the base member 3 on the X1 side end and a central base member 3, out of the three base members 3, and the module unit 20 on the X2 side is laid between the base member 3 on the X2 side end and the central base member 3, out of the three base members 3.

The slider 4 can move toward a central side of the linear module 2 from an end in the X direction of the linear module 2 to be engaged with the guide rails 22 of the linear module 2. The slider 4 engaged with the guide rails 22 in this way is driven in the X direction by the linear module 2. Further, the slider 4 can exit to outside from an end in the X direction of the linear module 2 to be separated from the guide rails 22 of the linear module 2.

Figure 3:
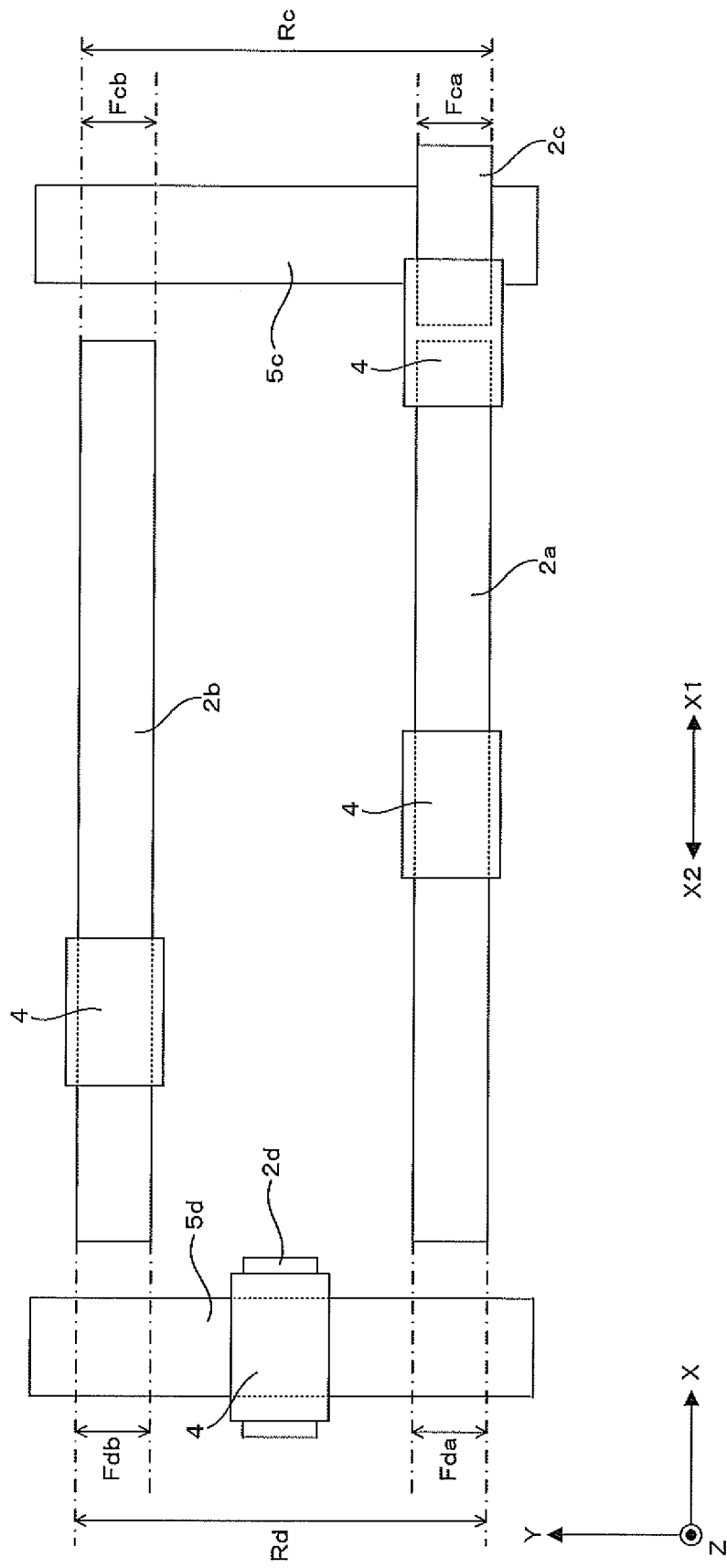
FIG. 3 is a diagram schematically showing an example of the linear conveyor system according to the disclosure.

FIG. 3 is a diagram schematically showing an example of the linear conveyor system according to the disclosure. The linear conveyor system 1 includes four linear modules 2. Note that mutually different signs 2a, 2b, 2c and 2d are given to the four linear modules 2 in FIG. 3.

The linear modules 2a, 2b are fixed linear modules fixed to an installation surface of the linear conveyor system 1, and the linear modules 2c, 2d are movable linear modules movable in the Y direction with respect to the installation surface. The fixed linear modules 2a, 2b and the movable linear modules 2c, 2d have different lengths in the X direction while having the same width in the Y direction. However, these have the common basic configuration shown in FIGS. 1 and 2 except the lengths in the X direction.

The two fixed linear modules 2a, 2b are arranged in parallel to the X direction while being spaced apart in the Y direction. The fixed linear modules 2a, 2b arranged in parallel to the X direction in this way have the same length in the X direction. On the other hand, the movable linear modules 2c, 2d have the same length shorter than the fixed linear modules 2a, 2b in the X direction.

Such a linear conveyor system 1 includes two actuators 5c, 5d which drive the movable linear modules 2c, 2d in the Y direction. The actuator 5c is arranged in parallel to the Y direction on the X1 sides of the fixed linear modules 2a, 2b in the X direction. The actuator 5d is arranged in parallel to the Y direction on the X2 sides of the fixed linear modules 2a, 2b in the X direction. In this way, the two actuators 5c, 5d are arranged to sandwich two fixed linear modules 2a, 2b in the X direction.

The actuator 5c is, for example, a single-axis robot including a ball screw parallel to the Y direction, and the movable linear module 2c is attached to a nut of the ball screw of the actuator 5c. This actuator 5c drives the movable linear module 2c in the Y direction along a movable region Rc. Here, the movable region Rc is a region extending in the Y direction and including a facing range Fca facing an end on the X1 side of the fixed linear module 2a from the X1 side in the X direction and a facing range Fcb facing an end on the X1 side of the fixed linear module 2b from the X1 side in the X direction. The facing range Fca is equivalent to a presence range (including a tolerance of the movable linear module 2c) of the movable linear module 2c arranged in a row with the fixed linear module 2a in the X direction, and the facing range Fcb is equivalent to a presence range (including a tolerance of the fixed linear module 2b) of the movable linear module 2c arranged in a row with the fixed linear module 2b in the X direction.

The actuator 5d is, for example, a single-axis robot including a ball screw parallel to the Y direction, and the movable linear module 2d is attached to a nut of the ball screw of the actuator 5d. This actuator 5d drives the movable linear module 2d in the Y direction along a movable region Rd. Here, the movable region Rd is a region extending in the Y direction and including a facing range Fda facing an end on the X2 side of the fixed linear module 2a from the X2 side in the X direction and a facing range Fdb facing an end on the X2 side of the fixed linear module 2b from the X2 side in the X direction. The facing range Fda is equivalent to a presence range (including a tolerance of the movable linear module 2d) of the movable linear module 2d arranged in a row with the fixed linear module 2a in the X direction, and the facing range Fdb is equivalent to a presence range (including a tolerance of the fixed linear module 2b) of the movable linear module 2d arranged in a row with the fixed linear module 2b in the X direction.

In such a linear conveyor system 1, the slider 4 can be cyclically driven. For example, the fixed linear module 2a drives the slider 4 engaged therewith toward the X1 side in the X direction with the movable linear module 2c located in the facing range Fca, whereby the slider 4 can be moved from the fixed linear module 2a to the movable linear module 2c. Then, after the actuator 5c moves the movable linear module 2c from the facing range Fca to the facing range Fcb, the movable linear module 2c located in the facing range Fcb drives the slider 4 engaged therewith toward the X2 side in the X direction, whereby the slider 4 can be moved from the movable linear module 2c to the fixed linear module 2b.

Further, the fixed linear module 2b drives the slider 4 engaged therewith toward the X2 side in the X direction with the movable linear module 2d located in the facing range Fdb, whereby the slider 4 can be moved from the fixed linear module 2b to the movable linear module 2d. Then, after the actuator 5d moves the movable linear module 2d from the facing range Fdb to the facing range Fda, the movable linear module 2d located in the facing range Fda drives the slider 4 engaged therewith toward the X1 side in the X direction, whereby the slider 4 can be moved from the movable linear module 2d to the fixed linear module 2a.

In this way, the slider 4 can be cyclically driven counterclockwise. Further, the slider 4 can be cyclically driven clockwise by performing an operation opposite to the above one. Note that cyclical drive is merely an example of a drive mode of the slider 4 executable by the linear conveyor system 1 and the slider 4 can be driven in various other modes.

Figure 4:
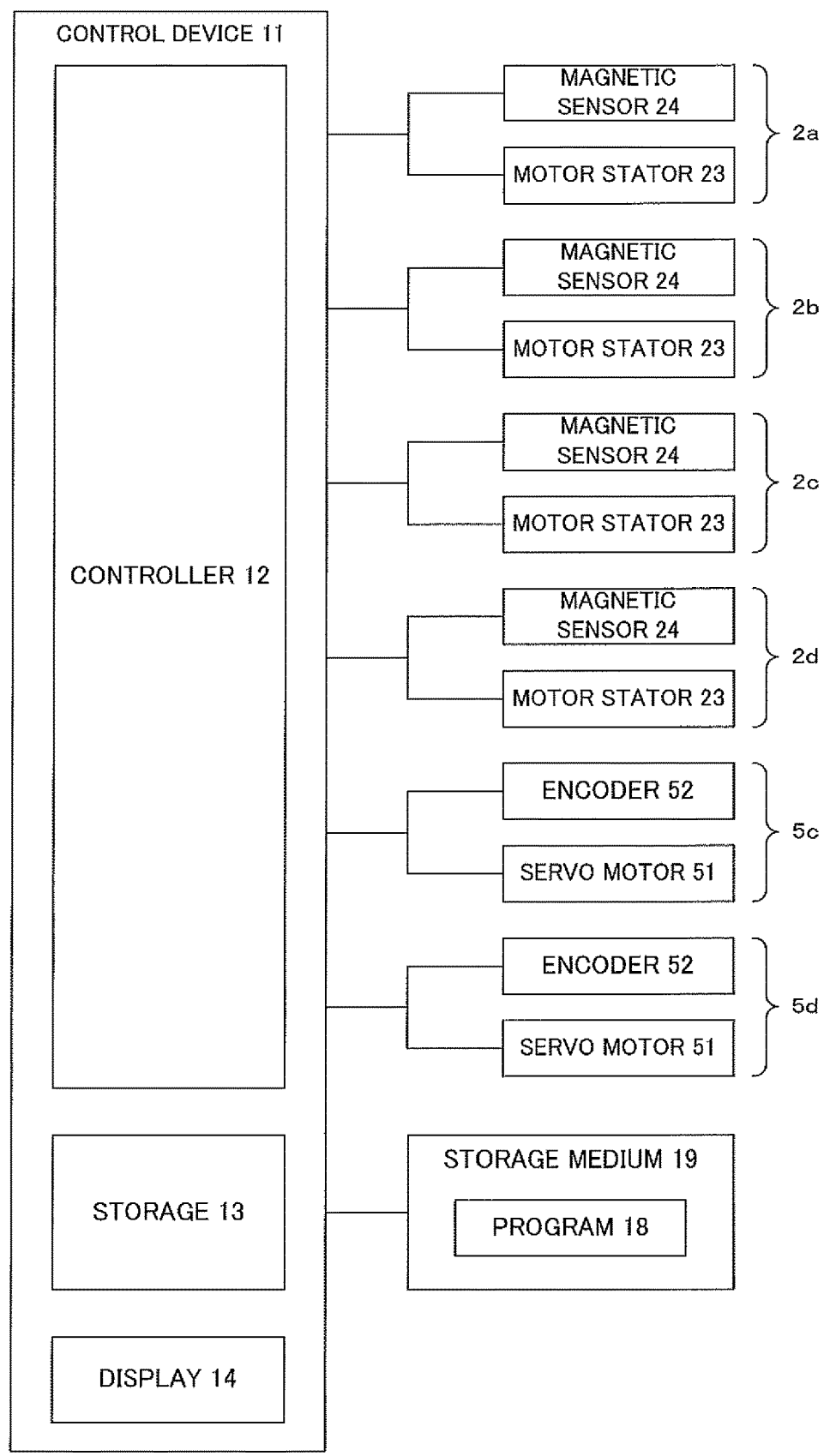
FIG. 4 is a block diagram showing an example of an electrical configuration of the linear conveyor system of FIG. 3.

FIG. 4 is a block diagram showing an example of an electrical configuration of the linear conveyor system of FIG. 3. The linear conveyor system 1 includes a control device 11 which controls the position of each slider 4 while monitoring the entire system. This control device 11 is a computer such as a personal computer.

The control device 11 includes a controller 12, a storage 13 and a display 14. The controller 12 is, for example, a processor configured by a CPU (Central Processing Unit) and performs computation in the control device 11. The storage 13 is, for example, configured by an HDD (Hard Disk Drive) and stores data and programs used in computation in the control device 2. Particularly, the storage 13 stores a program 18 which causes the controller 12 of the control device 11 to execute a control to be described later. This program 18 may be installed in the storage 13 by being provided in a state readable by the control device 11 by means of a storage medium 19 such as a USB (Universal Serial Bus) memory or may be installed in the storage 13 by being downloaded from an Internet server. The display 14 is, for example, a touch panel display and functions as a UI (User Interface) for not only showing displays to a user, but also receiving input operations from the user.

The controller 12 of such a control device 11 causes each of the fixed linear modules 2a to 2d to drive the slider 4 by feedback-controlling the linear motor stators 23 based on the position of the slider 4 detected by the magnetic sensors 24. Further, each of the actuators 5c, 5d includes a servo motor 51 which rotates the ball screw and an encoder 52 which detects the rotational position of the servo motor 51. The controller 12 causes the respective actuators 5c, 5d to drive the movable linear modules 2c, 2d by feedback-controlling the servo motors 51 based on the rotational positions detected by the encoders 52.

Figure 5:
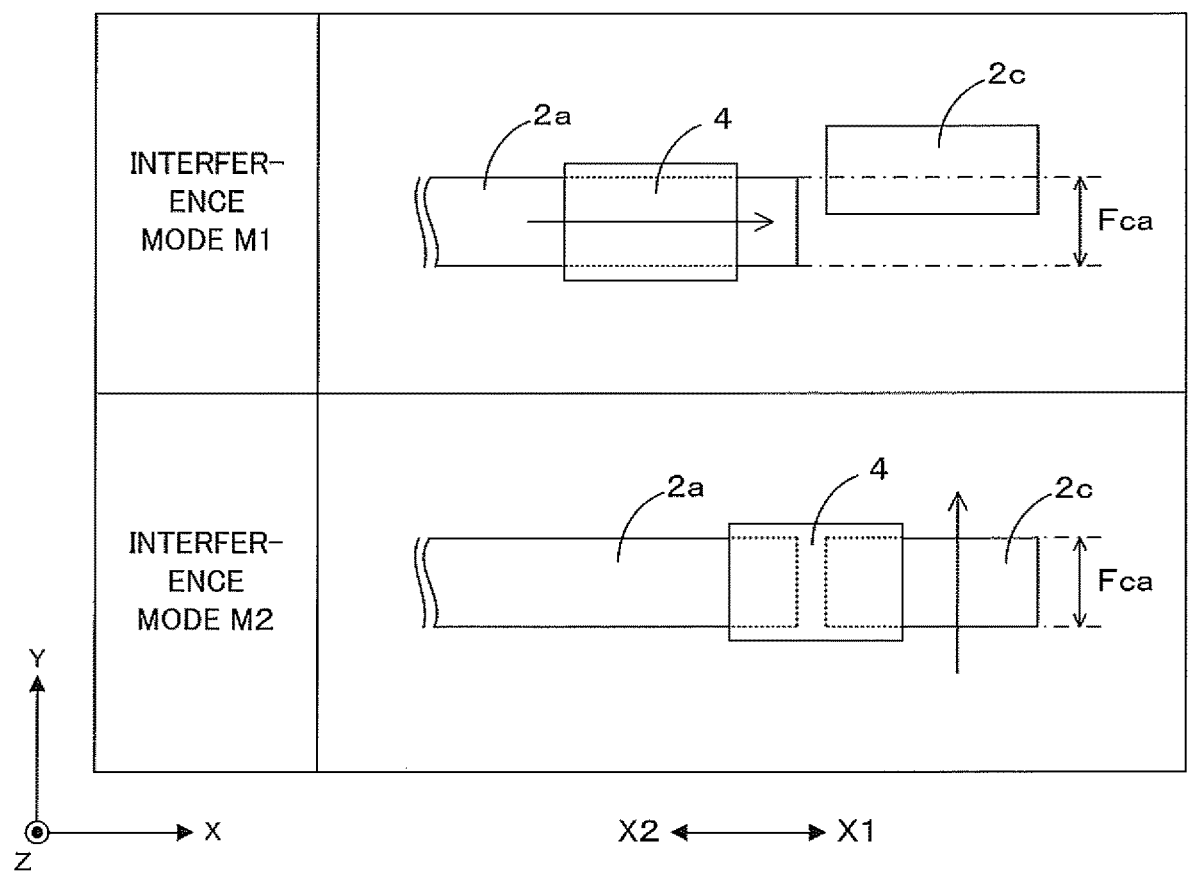
FIG. 5 is a diagram schematically showing interference modes occurring between the slider and the linear modules.

As shown in FIG. 5, the sliders and the linear modules possibly interfere with each other in various modes in such a linear conveyor system 1. FIG. 5 is a diagram schematically showing interference modes occurring between the slider and the linear modules.

In an interference mode M1, the fixed linear module 2a drives the slider 4 toward the facing range Fca on the X1 side with a part of the movable linear module 2c located outside the facing range Fca and the other part located in the facing range Fca. In this case, the slider 4 exiting toward the X1 side from the end of the fixed linear module 2a cannot be engaged with the movable linear module 2c and collides with the movable linear module 2c.

In an interference mode M2, the actuator 5c drives the movable linear module 2c in the Y direction with the slider 4 straddling on an end part on the X1 side of the fixed linear module 2a and an end part on the X2 side of the movable linear module 2c located in the facing range Fca. In this case, the fixed linear module 2a and the slider are pressed against each other in the Y direction and the movable linear module 2c and the slider 4 are pressed against each other in the Y direction.

If such interference modes M1, M2 occur, the fixed linear module 2a, the movable linear module 2c or the slider 4 may be broken. Further, these interference modes M1, M2 possibly occur not only for the linear modules 2a, 2c shown in FIG. 5, but similarly occur for the linear modules 2a, 2d, the linear modules 2b, 2c and the linear modules 2b, 2d. In contrast, in the linear conveyor system 1, the conveyance of the slider 4 is managed by a drive control described next to suppress such interferences.

Figure 6:
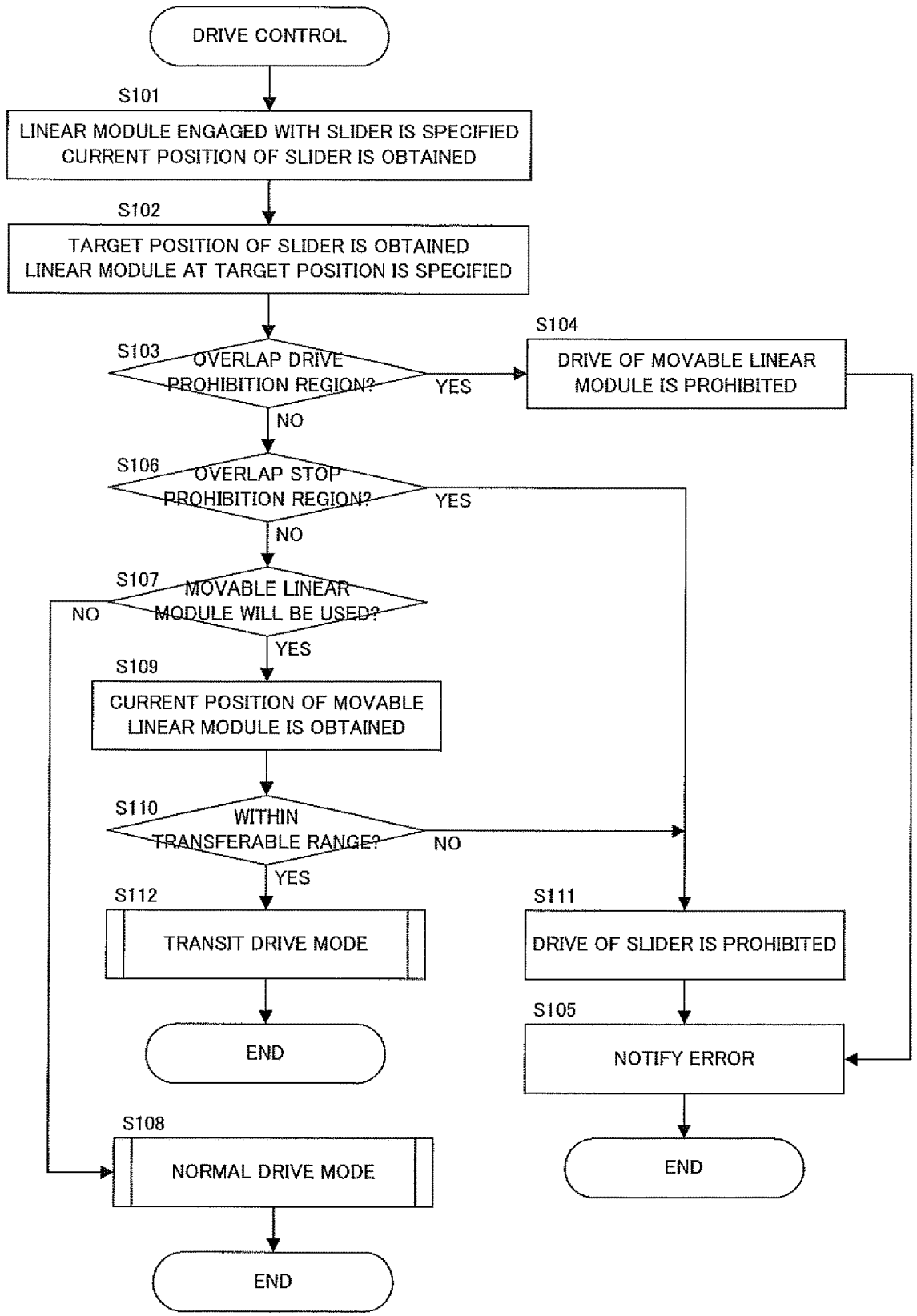
FIG. 6 is a flow chart showing an example of the drive control executed in the linear conveyor system shown in FIG. 3.
Figure 7:
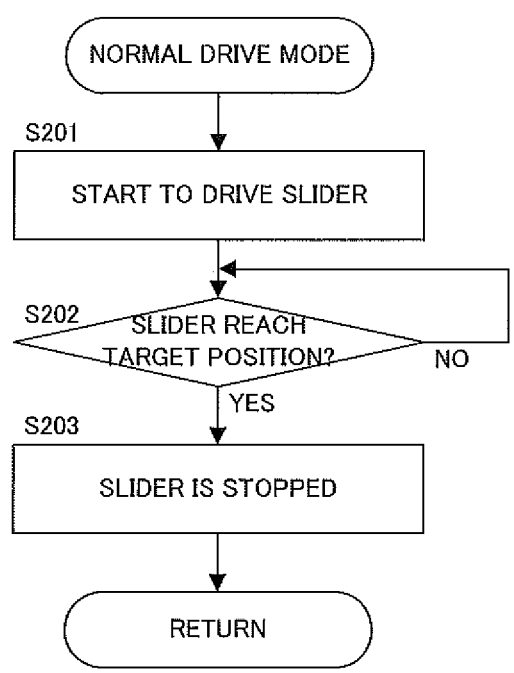
FIG. 7 is a flow chart showing an example of a normal drive mode carried out by the drive control of FIG. 6.
Figure 8:
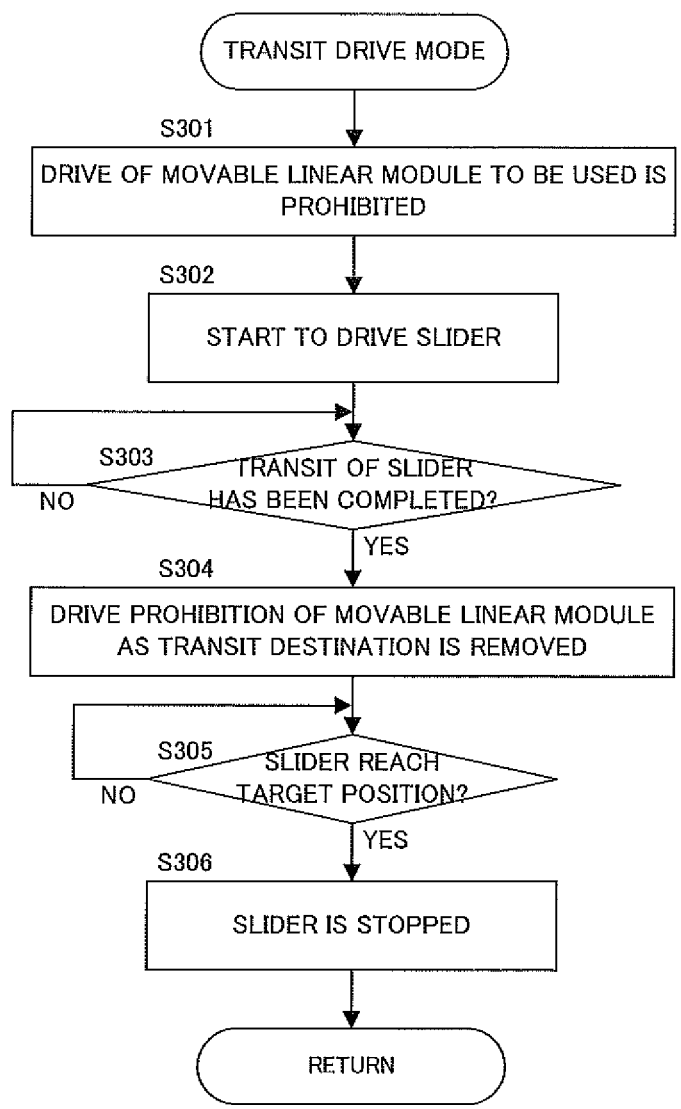
FIG. 8 is a flow chart showing an example of a transit drive mode carried out by the drive control of FIG. 6.
Figure 9:
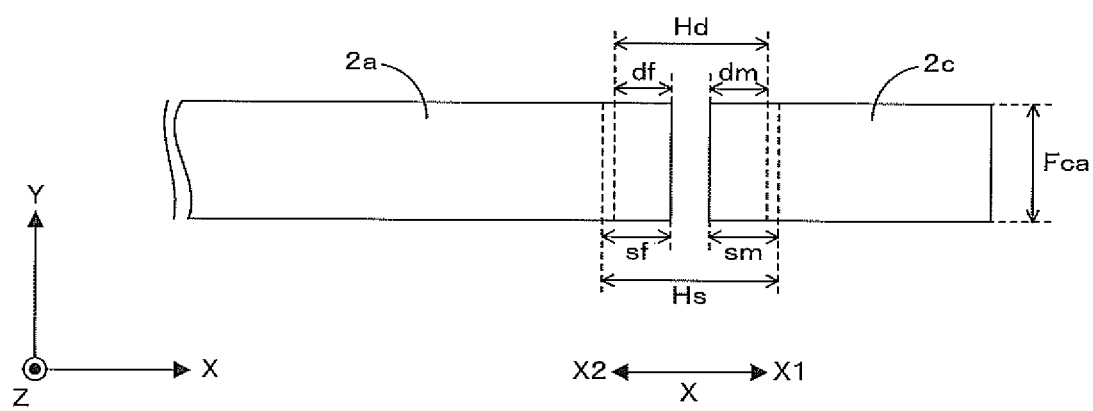
FIG. 9 is a diagram schematically showing various prohibition regions set for the linear modules by the drive control of FIG. 6.

FIG. 6 is a flow chart showing an example of the drive control executed in the linear conveyor system shown in FIG. 3, FIG. 7 is a flow chart showing an example of a normal drive mode carried out by the drive control of FIG. 6, FIG. 8 is a flow chart showing an example of a transit drive mode carried out by the drive control of FIG. 6, and FIG. 9 is a diagram schematically showing various prohibition regions set for the linear modules by the drive control of FIG. 6.

Each flow chart is specified by the program 18, and performed by the controller 12 controlling each component based on the program 18. Note that these flow charts can be commonly performed for a plurality of (four) sliders 4 provided in the linear conveyor system 1. However, a case where these flow charts are performed is described here, taking one of the four sliders 4 as a representative. Note that it is assumed that the slider 4 and the movable linear modules 2c, 2d are stopped when these flow charts are started.

In Step S101, one linear module 2 engaged with the slider 4 is specified, out of the four linear modules 2 (2a to 2d). Specifically, the linear module 2 can be specified by confirming the magnetic sensor 24 detecting the slider 4. Further, in Step S101, the current position of the slider 4 is obtained. If the linear module 2 engaged with the slider 4 is the fixed linear module 2a, 2b, the current position of the slider 4 can be obtained from a detection result of the magnetic sensors 24. If the linear module 2 engaged with the slider 4 is the movable linear module 2c, 2d, the current position of the slider 4 can be obtained from an output result of the encoder 52.

In Step S102, a target position (i.e. movement destination) of the slider 4 is obtained and the linear module 2 in charge of driving the slider 4 at the target position is specified from the four linear modules 2.

In Step S103, whether or not the slider 4 overlaps a drive prohibition region Hd is determined based on information obtained in Step S101. That is, the controller 12 sets the drive prohibition region Hd overlapping the end part of the fixed linear module 2a, 2b and an end part of the facing range Fca, Fda, Fcb, Fdb (in other words, the movable linear module 2c, 2d located in the facing range Fca, Fda, Fcb, Fdb) adjacent in the X direction. This point is described using FIG. 9 showing the fixed linear module 2a and the movable linear module 2c located in the facing range Fca as an example.

As described above, the movable linear module 2c located in the facing range Fca is facing the end on the X1 side of the fixed linear module 2a from the X1 side. In contrast, the drive prohibition region Hd is set to include the end part on the X1 side (one side) of the fixed linear module 2a and the end part on the X2 side (other side) of the movable linear module 2c located in the facing range Fca. In other words, the drive prohibition region Hd is set to include the end part of the fixed linear module 2a and the end part of the movable linear module 2c located in the facing range Fca which are adjacent to each other in the X direction. That is, in the X direction, an end on the X2 side of the drive prohibition region Hd is located on the X2 side of the end on the X1 side of the fixed linear module 2a and an end on the X1 side of the drive prohibition region Hd is located on the X1 side of the end on the X2 side of the movable linear module 2c in the facing range Fca. A length in the X direction of an overlapping range df in which the fixed linear module 2a and the drive prohibition region Hd overlap and that of an overlapping range dm in which the movable linear module 2c and the drive prohibition region Hd overlap are equal.

As just described, in the X direction, the drive prohibition region Hd is set to include the end part of the fixed linear module 2a and the end part of the facing range Fca adjacent to each other. Here, the facing range Fca has the width (including the tolerance of the movable linear module 2c) of the movable linear module 2c in the Y direction as described above. Further, in the X direction, the facing range Fca has the same length as the movable linear module 2c and the positions on both sides of the facing range Fca are aligned with the positions on both ends of the movable linear module 2c. Further, each of the facing ranges Fda, Fcb and Fdb other than the facing range Fca has a similar dimensional relationship with the movable linear module 2c or 2d in the X direction and the Y direction, and drive prohibition regions Hd are similarly set for these facing ranges.

Specifically, such drive prohibition regions Hd are set for:
The end part of the fixed linear module 2a and the end part of the facing range Fca (in other words, the movable linear module 2c located in the facing range Fca) adjacent in the X direction.
The end part of the fixed linear module 2a and the end part of the facing range Fda (in other words, the movable linear module 2d located in the facing range Fda) adjacent in the X direction.
The end part of the fixed linear module 2b and the end part of the facing range Fcb (in other words, the movable linear module 2c located in the facing range Fcb) adjacent in the X direction.
The end part of the fixed linear module 2b and the end part of the facing range Fdb (in other words, the movable linear module 2d located in the facing range Fdb) adjacent in the X direction.

In Step S103, it is determined whether or not the slider 4 overlaps the drive prohibition region Hd, i.e. the slider 4 is at least partially located in the drive prohibition region Hd. If the slider 4 overlaps the drive prohibition region Hd ("YES" in Step S103), the drive (i.e. movement in the Y direction) of the movable linear module 2c, 2d overlapping the drive prohibition region Hd is prohibited (Step S104). For example, if the slider 4 overlaps the drive prohibition region Hd set on a boundary between the fixed linear module 2a and the facing range Fca, the drive of the movable linear module 2c is prohibited. In this way, the drive of the movable linear module 2c is prohibited if the slider 4 straddles on both the fixed linear module 2a and the movable linear module 2c (i.e. overlaps the both) as shown in the "Interference Mode M2" of FIG. 5. Thus, the occurrence of the "Interference Mode M2" shown in FIG. 5 can be suppressed. Further, even if the slider 4 does not straddle on these, the drive of the movable linear module 2c is prohibited if the slider 4 partially overlaps the drive prohibition region Hd. In this way, the occurrence of the interference mode M2 can be more reliably suppressed.

In Step S105, the display 14 notifies the drive prohibition of the movable linear module 2c, 2d to the user. At this time, the display 14 also notifies a cause for prohibiting the drive of the movable linear module 2c, 2d. Specifically, the display 14 displays, for example, an error code composed of a combination of numbers or displays that the slider 4 is existing in the drive prohibition region Hd in language. At this time, only the former or the latter may be displayed or the latter may be displayed when the user performs an operation such as a touch operation in response to the former after the former is displayed.

On the other hand, if the slider 4 currently stopped is located outside each drive prohibition region Hd and does not overlap any of the drive prohibition regions Hd ("NO" in Step S103), it is determined whether or not the slider 4 after a movement to the target position will overlap a stop prohibition region Hs. That is, the controller 12 sets the stop prohibition regions Hs overlapping the end parts of the fixed linear modules 2*a*, 2*b* and the end parts of the facing ranges Fca, Fda, Fcb and Fdb (in other words, the movable linear modules 2*c*, 2*d* located in the facing ranges Fca, Fda, Fcb and Fdb) adjacent in the X direction. This point is described using FIG. 9 showing the fixed linear module 2*a* and the movable linear module 2*c* located in the facing range Fca as an example.

As described above, the movable linear module 2*c* located in the facing range Fca is facing the end on the X1 side of the fixed linear module 2*a* from the X1 side. In contrast, the stop prohibition region Hs is set to include the end part on the X1 side (one side) of the fixed linear module 2*a* and the end part on the X2 side (other side) of the movable linear module 2*c* located in the facing range Fca. In other words, the stop prohibition region Hs is set to include the end part of the fixed linear module 2*a* and the end part of the movable linear module 2*c* located in the facing range Fca which are adjacent to each other in the X direction. That is, in the X direction, an end on the X2 side of the stop prohibition region Hs is located on the X2 side of the end on the X1 side of the fixed linear module 2*a* and an end on the X1 side of the stop prohibition region Hs is located on the X1 side of the end on the X2 side of the movable linear module 2*c* in the facing range Fca. A length in the X direction of an overlapping range sf in which the fixed linear module 2*a* and the stop prohibition region Hs overlap and that of an overlapping range sm in which the movable linear module 2*c* and the stop prohibition region Hs overlap are equal. As just described, in the X direction, the stop prohibition region Hs is set to include the end part of the fixed linear module 2*a* and the end part of the facing range Fca adjacent to each other. Further, stop prohibition regions Hs are similarly set for the facing ranges Fda, Fcb and Fdb other than the facing range Fca.

Specifically, such stop prohibition regions Hs are set for:

The end part of the fixed linear module 2*a* and the end part of the facing range Fca (in other words, the movable linear module 2*c* located in the facing range Fca) adjacent in the X direction.

The end part of the fixed linear module 2*a* and the end part of the facing range Fda (in other words, the movable linear module 2*d* located in the facing range Fda) adjacent in the X direction.

The end part of the fixed linear module 2*b* and the end part of the facing range Fcb (in other words, the movable linear module 2*c* located in the facing range Fcb) adjacent in the X direction.

The end part of the fixed linear module 2*b* and the end part of the facing range Fdb (in other words, the movable linear module 2*d* located in the facing range Fdb) adjacent in the X direction.

In Step S106, it is predicted whether or not the slider 4 will overlap the stop prohibition region Hs, i.e. the slider 4 will be at least partially located in the stop prohibition region Hs when the slider 4 is moved to the target position. If the moved slider 4 is predicted to overlap the stop prohibition region Hs ("YES" in Step S106), the drive of the slider 4 is prohibited (Step S111). In this way, the slider 4 is prevented from stopping at target position with straddling on both the fixed linear module 2*a* and movable linear module 2*c* (i.e. overlaping the both) as illustrated in the "Interference Mode M2" of FIG. 5. As a result, the occurrence of the "Interference Mode M2" shown in FIG. 5 by moving the slider 4 to the target position and driving the movable linear module 2*c* can be prevented in advance. Further, if the slider 4 is predicted to partially overlap the stop prohibition region Hs even without straddling on the fixed linear module 2*a* and the movable linear module 2*c*, the drive of the slider 4 is prohibited. In this way, the occurrence of the interference mode M2 can be more reliably prevented.

In Step S105, the display 14 notifies the drive prohibition of the slider 4 to the user. At this time, the display 14 also notifies a cause for prohibiting the drive of the slider 4. Specifically, the display 14 displays, for example, an error code composed of a combination of numbers or displays that the slider to be moved will locate in the stop prohibition region Hs in language. At this time, only the former or the latter may be displayed or the latter may be displayed when the user performs an operation such as a touch operation in response to the former after the former is displayed.

On the other hand, if the slider 4 is located outside each stop prohibition region Hs and predicted not to overlap any one of the stop prohibition regions Hs when the slider 4 is moved to the target position ("NO" in Step S106), it is determined whether or not the movable linear module 2*c*, 2*d* will be used to move the slider 4 from the current position to the target position (Step S107). If the movable linear module 2*c*, 2*d* is not used ("NO" in Step S107), the normal drive mode of Step S108 is carried out.

As shown in FIG. 7, in the normal drive mode, the linear module 2 engaged with the slider 4 starts to drive the slider 4 (Step S201). Then, when the slider 4 reaches the target position ("YES" in Step S202), the slider 4 is stopped (Step S203).

On the other hand, if the movable linear module 2*c*, 2*d* will be used to move the slider 4 ("YES" in Step S107), the current position of the movable linear module 2*c*, 2*d* planned to be used is obtained (Step S109). In Step S110, it is determined whether or not a transit of the slider 4 from the fixed linear module 2*a*, 2*b* engaged with the slider 4 which is stopping to the movable linear module 2*c*, 2*d* planned to be used is possible. Specifically, whether or not the transit is possible is determined based on whether or not the movable linear module 2*c*, 2*d* planned to be used is located in the facing range Fca, Fcb, Fda, Fda corresponding to the fixed linear module 2*a*, 2*b* engaged with the slider 4 which is stopping. If the transit is not possible ("NO" in Step S110), advance is made to Step S111.

For example, if the slider 4 engaged with the fixed linear module 2*a* is moved using the movable linear module 2*c*, it is determined whether or not the movable linear module 2*c* is located in the facing range Fca. If the movable linear module 2*c* is at least partially located outside the facing range Fca, it is determined that the transit is not possible (NO) in Step S110 and advance is made to Step S111.

In Step S111, the drive of the slider 4 is prohibited. In this way, if the movable linear module 2*c* is at least partially located outside the facing range Fca, for example, as illustrated in the "Interference Mode M1" of FIG. 5, the drive of the slider 4 is prohibited. Thus, the occurrence of the "Interference Mode M1" shown in FIG. 5 can be suppressed.

In Step S105, the display 14 notifies the drive prohibition of the slider 4 to the user. At this time, the display 14 also notifies a cause for prohibiting the drive of the slider 4. Specifically, the display 14 displays, for example, an error code composed of a combination of numbers or displays in language that the slider 4 cannot transit since the movable linear module 2c deviates from the facing range Fca. At this time, only the former or the latter may be displayed or the latter may be displayed when the user performs an operation such as a touch operation in response to the former after the former is displayed.

On the other hand, if it is determined that the transit of the slider 4 from the fixed linear module 2a, 2b engaged with the slider 4 which is stopping to the movable linear module 2c, 2d planned to be used is possible (YES), the transit drive mode of Step S112 is carried out. For example, if the slider 4 engaged with the fixed linear module 2a is moved using the movable linear module 2c, it is determined in Step S110 that the transit is possible (YES) and advance is made to Step S112 when the movable linear module 2c is determined to be located in the facing range Fca.

As shown in FIG. 8, in the transit drive mode, the drive of the movable linear module 2c, 2d to be used is prohibited (Step S301). In this way, for example, if the slider 4 engaged with the fixed linear module 2a is moved using the movable linear module 2c, the drive of the movable linear module 2c from the facing range Fca is prohibited.

In this way, the drive of the slider 4 is started (Step S302) with the movable linear module 2c, 2d to be used stopped. When it is determined that the transit of the slider 4 has been completed ("YES" in Step S303), the drive prohibition of the movable linear module 2c, 2d as a transit destination is removed. For example, if the slider 4 engaged with the fixed linear module 2a is moved using the movable linear module 2c, the drive prohibition of the movable linear module 2c is removed after the transit of the slider 4 from the fixed linear module 2a to the movable linear module 2 is completed.

Then, the movable linear module 2c, 2d drives the received slider 4 to the target position. In an example of receiving the slider 4 from the fixed linear module 2a by the movable linear module 2c, the movable linear module 2c moves the slider 4 to the target position if the target position of the slider 4 is on the movable linear module 2c. Alternatively, if the target position of the slider 4 is on the fixed linear module 2b, the slider 4 is driven to the facing range Fcb equivalent to an intermediate position of a route to the target position by the movable linear module 2c, further transferred from the movable linear module 2c in the facing range Fcb to the fixed linear module 2b and driven to the target position. When the slider 4 reaches the target position ("YES" in Step S305), the slider 4 is stopped (Step S306).

In the embodiment described above, the plurality of fixed linear modules 2a, 2b are arrayed in the Y direction and each fixed linear module 2a, 2b extends in the X direction orthogonal to the Y direction and can drive the slider 4 in the X direction. Further, to transfer the slider 4 between these plurality of fixed linear modules 2a and 2b, a slider transfer mechanism is provided which includes the movable linear module 2c, 2d and the actuator 5c, 5d. This slider transfer mechanism includes the movable linear module 2c, 2d movable in the Y direction. This movable linear module 2c, 2d is movable between a plurality of the facing ranges Fca, Fcb, Fda, Fdb, which are arranged in the Y direction and face the plurality of fixed linear modules 2a, 2b from the X direction, and can move the slider 4 in the X direction. The slider 4 can be moved between the movable linear module (e.g. movable linear module 2c) located in one facing range (e.g. facing range Fca), out of the plurality of facing ranges Fca, Fcb, Fda and Fdb, and the fixed linear module (e.g. fixed linear module 2a) facing the one facing range (e.g. facing range Fca). By using such a slider transfer mechanism, the slider 4 can be transferred between the plurality of fixed linear modules 2a, 2b.

In this embodiment, whether to permit or prohibit the drive of at least one object, out of the slider 4 and the movable linear module 2c, 2d, is determined based on position related information on the position of the slider 4 or the movable linear module 2c, 2d before the drive of the object is started. In this way, the occurrence of interference of the linear module 2a to 2d and the slider 4 can be suppressed in the linear conveyor system 1 for transferring the slider 4 between the plurality of fixed linear modules 2a, 2b using the movable linear modules 2c, 3d.

Further in Step S110, the position (position related information) of the movable linear module 2c, 2d before the drive of the slider 4 is started is obtained. Then, to drive the slider 4 to the target position, the controller 12 executes the following control if the slider 4 needs to be moved from one fixed linear module (e.g. 2a), out of the plurality of fixed linear modules 2a, 2b, to the movable linear module (e.g. 2c) ("YES" in Step S108). That is, if the movable linear module (e.g. 2c) is located in the facing region (e.g. Fca) facing the one fixed linear module (e.g. 2a), the drive of the slider from the one fixed linear module (e.g. 2a) to the facing region (e.g. Fca) is permitted. On the other hand, if the movable linear module (e.g. 2c) is at least partially located outside the facing region (e.g. Fca) facing the one fixed linear module (e.g. 2a), the drive of the slider 4 is prohibited. In this way, the occurrence of interference of the slider 4 and the movable linear module 2c, 2d can be suppressed when the slider 4 is moved from the fixed linear module 2a, 2b to the movable linear module 2c, 2d.

If the drive of the slider 4 is permitted, the controller 12 prohibits the drive of the movable linear module (e.g. 2c) in the Y direction from the facing region (e.g. Fca) facing the one fixed linear module (e.g. 2a) until a movement of the slider 4 from the one fixed linear module (e.g. 2a) to the movable linear module (e.g. 2c) is completed. In this way, the movement of the slider 4 from the fixed linear module 2a, 2b to the movable linear module 2c, 2d can be completed while the interference of the slider 4 and the movable linear module 2c, 2d is suppressed.

Further in Step S101, the position (position related information) of the slider 4 before the drive of the slider 4 is started is obtained. Then, the controller 12 permits the drive of the movable linear module 2c, 2d if the slider 4 before the start of the drive does not overlap the drive prohibition region Hd including the end part of the fixed linear module 2a, 2b and the end part of the facing region Fca, Fda, Fcb, Fdb facing each other, and prohibits the drive of the movable linear module 2c, 2d if the slider 4 before the start of the drive overlaps the drive prohibition region Hd. In such a configuration, it is possible to suppress the occurrence of interference of the slider 4 and the movable linear module 2c, 2d due to the drive of the movable linear module 2c, 2d in the Y direction with the slider 4 engaged with both the end part of the fixed linear module 2a, 2b and the end part of the movable linear module 2c, 2d.

Further in Step S102, the target position (position related information) as a drive destination of the slider 4 is obtained. Then, the controller 12 permits the drive of the slider 4 to the target position if the slider 4 driven to the target position is predicted not to overlap the stop prohibition region Hs including the end part of the fixed linear module 2a, 2b and the end part of the facing region Fca, Fda, Fcb, Fdb facing each other, and prohibits the drive of the slider 4 if the slider 4 driven to the target position is predicted to overlap the stop prohibition region Hs. That is, if the slider 4 overlaps the stop prohibition region Hs as a result of driving the slider 4 to the target position, the slider 4 may stop while being engaged with both the end part of the fixed linear module 2a, 2b and the end part of the movable linear module 2c, 2d. At this time, if the movable linear module 2c, 2d is driven in the Y direction, interference occurs between the slider 4 and the movable linear module 2c, 2d. Accordingly, the occurrence of interference between these can be suppressed by prohibiting the drive of the slider 4 in the first place if the slider 4 driven to the target position will overlap the stop prohibition region Hs.

Further, the display 14 is provided which notifies that the controller 12 prohibits the drive of the object (slider 4, movable linear module 2c, 2d) to the user. In such a configuration, the user can appropriately perform an operation for the removal of the drive prohibition after grasping the drive prohibition of the object (slider 4, movable linear module 2c, 2d).

The display 14 also notifies a cause for prohibiting the drive of the object (slider 4, movable linear module 2c, 2d). In such a configuration, the user can effectively perform the operation for the removal of the drive prohibition by grasping the cause for prohibiting the drive of object (slider 4, movable linear module 2c, 2d).

As just described, in this embodiment, the linear conveyor system 1 corresponds to an example of a "linear conveyor system" of the disclosure, the slider 4 corresponds to an example of a "slider" of the disclosure, the fixed linear modules 2a, 2b correspond to an example of "fixed linear modules" of the disclosure, the movable linear modules 2c, 2d correspond to an example of a "movable linear module" of the disclosure, the movable linear module 2c, 2d and the actuator 5c, 5d cooperate to constitute a "slider transfer mechanism" of the disclosure, the controller 12 corresponds to an example of a "controller" of the disclosure, the display 14 corresponds to an example of a "notifier" of the disclosure, the X direction corresponds to an example of a "first direction" of the disclosure, the Y direction corresponds to an example of a "second direction" of the disclosure, the drive prohibition region Hd corresponds to an example of a "drive prohibition region" of the disclosure, the stop prohibition region Hs corresponds to an example of a "stop prohibition region" of the disclosure, the program 18 corresponds to an example of a "control program for linear conveyor system" of the disclosure, the storage medium 19 corresponds to an example of a "storage medium" of the disclosure, and the control device 11 corresponds to an example of a "computer" of the disclosure.

Note that the disclosure is not limited to the above embodiment and various changes can be made to the aforementioned one without departing from the gist of the disclosure. For example, an array direction of the fixed linear modules 2a, 2b is not limited to the Y direction (horizontal direction) and may be the Z direction (vertical direction). In this case, the actuators 5c, 5d move the movable linear modules 2c, 2d upward and downward in the Z direction.

Further, the linear conveyor system 1 may be configured such that the slider 4 is moved along an L-shaped path constituted by one fixed linear module 2a and one actuator 5d for driving the movable linear module 2d. Alternatively, the fixed linear module 2b may be moved in parallel to the X direction from the state of FIG. 3 and arranged on a side opposite to the fixed linear module 2a with respect to the actuator 5c.

Further, the number of the fixed linear modules 2a, 2b is not limited to two and may be three or more.

Further, the dimensions of the drive prohibition region Hd may be changed as appropriate. For example, the overlapping range df may be shorter or longer than the overlapping range dm.

Further, the dimensions of the stop prohibition region Hs may be changed as appropriate. For example, the overlapping range sf may be shorter or longer than the overlapping range sm.

Further, the driving directions of the slider 4 by the fixed linear modules 2a, 2b need not necessarily be orthogonal to the driving directions of the slider 4 by the actuators 5c, 5d and may be inclined with respect to the latter driving directions.

What is claimed is:

1. A linear conveyor system, comprising:
a plurality of fixed linear modules respectively extending in a first direction, configured to drive a slider in the first direction and arrayed in a second direction intersecting the first direction;
a slider transfer mechanism including a movable linear module movable between a plurality of facing ranges, which are arranged in the second direction and respectively face the plurality of fixed linear modules from the first direction, and configured to drive the slider in the first direction, the slider transfer mechanism being configured to convey the movable linear module between the plurality of facing ranges by driving the movable linear module in the second direction; and
a controller configured to control drive of at least one object, out of the slider and the movable linear module, wherein:
the slider is engageable with and disengageable from the fixed linear module from an end in the first direction and the fixed linear module is configured to drive the slider engaged with the fixed linear module in the first direction,
the slider is engageable with and disengageable from the movable linear module from an end in the first direction and the movable linear module is configured to drive the slider engaged with the movable linear module in the first direction,
the slider is configured to move between the movable linear module located in one facing range, out of the plurality of facing ranges, and the fixed linear module facing the one facing range, and
the controller is configured to determine whether to permit or prohibit the drive of the object based on position related information on position of the slider or the movable linear module before the drive of the object is started.

2. The linear conveyor system according to claim 1, wherein:
the position related information includes the position of the movable linear module before the drive of the slider is started, and
the controller is configured to permit the drive of the slider from one fixed linear module, out of the plurality of fixed linear modules, to the facing range if the movable linear module is located in the facing range facing the one fixed linear module when the slider needs to be moved from the one fixed linear module to the movable linear module to drive the slider to a target position, and the controller is configured to prohibit the drive of the slider if the movable linear module is at least partially located outside the facing range facing the one fixed linear module.

3. The linear conveyor system according to claim 2, wherein the controller is configured to prohibit the drive of the movable linear module in the second direction from the facing range facing the one fixed linear module until a movement of the slider from the one fixed linear module to the movable linear module is completed in the case of permitting the drive of the slider.

4. The linear conveyor system according to claim 1, wherein:
the position related information includes the position of the slider before the drive of the slider is started, and
the controller is configured to permit the drive of the movable linear module if the slider before the start of the drive does not overlap a drive prohibition region including an end part of the fixed linear module and an end part of the facing range facing each other, and is configured to prohibit the drive of the movable linear module if the slider before the start of the drive overlaps the drive prohibition region.

5. The linear conveyor system according to, claim 1, wherein:
the position related information includes a target position as a drive destination of the slider, and
the controller is configured to permit the drive of the slider to the target position if the slider driven to the target position is predicted not to overlap a stop prohibition region including an end part of the fixed linear module and an end part of the facing range facing each other, and configured to prohibit the drive of the slider if the slider driven to the target position is predicted to overlap the stop prohibition region.

6. The linear conveyor system according to claim 1, further comprising:
a notifier configured to notify prohibition of the drive of the object by the controller to a user.

7. The linear conveyor system according to claim 6, wherein the notifier is configured to further notify a cause for prohibiting the drive of the object.

8. The linear conveyor system according to claim 2, wherein:
the position related information includes the position of the slider before the drive of the slider is started, and
the controller is configured to permit the drive of the movable linear module if the slider before the start of the drive does not overlap a drive prohibition region including an end part of the fixed linear module and an end part of the facing range facing each other, and is configured to prohibit the drive of the movable linear module if the slider before the start of the drive overlaps the drive prohibition region.

9. The linear conveyor system according to claim 8, wherein:
the position related information includes a target position as a drive destination of the slider, and
the controller is configured to permit the drive of the slider to the target position if the slider driven to the target position is predicted not to overlap a stop prohibition region including an end part of the fixed linear module and an end part of the facing range facing each other, and configured to prohibit the drive of the slider if the slider driven to the target position is predicted to overlap the stop prohibition region.

10. The linear conveyor system according to claim 8, further comprising:
a notifier configured to notify prohibition of the drive of the object by the controller to a user.

11. The linear conveyor system according to claim 3, wherein:
the position related information includes the position of the slider before the drive of the slider is started, and
the controller is configured to permit the drive of the movable linear module if the slider before the start of the drive does not overlap a drive prohibition region including an end part of the fixed linear module and an end part of the facing range facing each other, and is configured to prohibit the drive of the movable linear module if the slider before the start of the drive overlaps the drive prohibition region.

12. The linear conveyor system according to claim 3, wherein:
the position related information includes a target position as a drive destination of the slider, and
the controller is configured to permit the drive of the slider to the target position if the slider driven to the target position is predicted not to overlap a stop prohibition region including an end part of the fixed linear module and an end part of the facing range facing each other, and configured to prohibit the drive of the slider if the slider driven to the target position is predicted to overlap the stop prohibition region.

13. The linear conveyor system according to claim 2, wherein:
the position related information includes a target position as a drive destination of the slider, and
the controller is configured to permit the drive of the slider to the target position if the slider driven to the target position is predicted not to overlap a stop prohibition region including an end part of the fixed linear module and an end part of the facing range facing each other, and configured to prohibit the drive of the slider if the slider driven to the target position is predicted to overlap the stop prohibition region.

14. The linear conveyor system according to claim 2, further comprising:
a notifier configured to notify prohibition of the drive of the object by the controller to a user.

15. The linear conveyor system according to claim 3, further comprising:
a notifier configured to notify prohibition of the drive of the object by the controller to a user.

16. The linear conveyor system according to claim 4, wherein:
the position related information includes a target position as a drive destination of the slider, and
the controller is configured to permit the drive of the slider to the target position if the slider driven to the target position is predicted not to overlap a stop prohibition region including an end part of the fixed linear module and an end part of the facing range facing each other, and configured to prohibit the drive of the slider if the slider driven to the target position is predicted to overlap the stop prohibition region.

17. The linear conveyor system according to claim 4, further comprising:
a notifier configured to notify prohibition of the drive of the object by the controller to a user.

18. The linear conveyor system according to claim 5, further comprising:
a notifier configured to notify prohibition of the drive of the object by the controller to a user.

19. A control method for a linear conveyor system, the linear conveyor system including a plurality of fixed linear modules respectively extending in a first direction, capable of driving a slider in the first direction and arrayed in a second direction intersecting the first direction, and a slider transfer mechanism having a movable linear module movable between a plurality of facing ranges, which are arranged in the second direction and respectively face the plurality of fixed linear modules from the first direction, and capable of driving the slider in the first direction, the slider transfer mechanism is configured to convey the movable linear module between the plurality of facing ranges by driving the movable linear module in the second direction, the slider being engageable with and disengageable from the fixed linear module from an end in the first direction, the fixed linear module is configured to drive the slider engaged with the fixed linear module in the first direction, the slider being engageable with and disengageable from the movable linear module from an end in the first direction, the movable linear module is configured to drive the slider engaged with the movable linear module in the first direction, the slider being movable between the movable linear module located in one facing range, out of the plurality of facing ranges, and the fixed linear module facing the one facing range, the control method comprising:

obtaining position related information on position of the slider or the movable linear module; and determining whether to permit or prohibit drive of at least one object, out of the slider and the movable linear module, based on the position related information before the drive of the object is started.

20. A computer readable medium storing a control program for a linear conveyor system, the linear conveyor system including a plurality of fixed linear modules respectively extending in a first direction, capable of driving a slider in the first direction and arrayed in a second direction intersecting the first direction, and a slider transfer mechanism having a movable linear module movable between a plurality of facing ranges, which are arranged in the second direction and respectively face the plurality of fixed linear modules from the first direction, and capable of driving the slider in the first direction, the slider transfer mechanism being configured to convey the movable linear module between the plurality of facing ranges by driving the movable linear module in the second direction, the slider being engageable with and disengageable from the fixed linear module from an end in the first direction, the fixed linear module being configured to drive the slider engaged with the fixed linear module in the first direction, the slider being engageable with and disengageable from the movable linear module from an end in the first direction, the movable linear module being configured to drive the slider engaged with the movable linear module in the first direction, the slider being movable between the movable linear module located in one facing range, out of the plurality of facing ranges, and the fixed linear module facing the one facing range, the control program causing a computer to:

obtain position related information on position of the slider or the movable linear module; and determine whether to permit or prohibit drive of at least one object, out of the slider and the movable linear module, based on the position related information before the drive of the object is started.

\* \* \* \* \*